Patented July 25, 1939

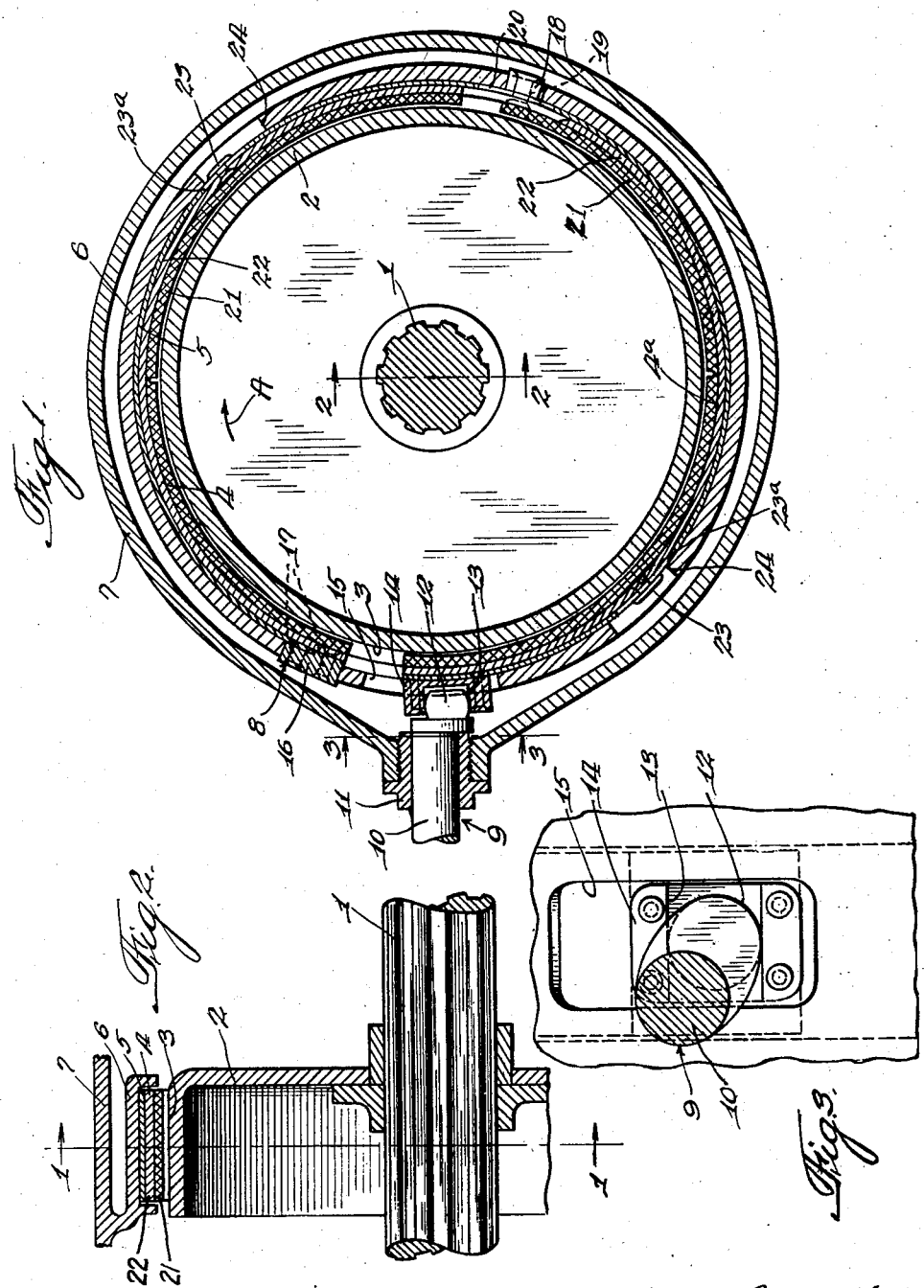

2,167,171

UNITED STATES PATENT OFFICE 2,167,171

TRANSMISSION BRAKE

Adiel Y. Dodge, Rockford, Ill.

Application April 6, 1938, Serial No. 200,387

20 Claims. (Cl. 188—77)

My invention relates to a rotation controlling construction, and more specifically to a clutch control for transmissions.

One of the objects of my invention is to provide such a construction having an external actuating band to which arcuate gripping band means are secured, and means for definitely limiting the expanding movement of the actuating band so that in its extreme expanded position it will be concentric with the rotatable member so that the gripping bands carried thereby will be uniformly spaced throughout their extent with respect to the gripping surface of the rotatable member.

A further object of my invention is to provide such a construction in which a number of arcuate gripping band members are secured to the actuating band to move radially in and out therewith and in which at least one of said gripping band members can move circumferentially with respect to the actuating band and in which abutment means are provided for holding the gripping band member against any substantial circumferential movement.

A further object of my invention is to provide a construction as indicated above, in which the resultant radial load imposed on the shaft or the supporting bearings (not shown) is reduced to nil.

A further object of my invention is to provide a construction as indicated above, in which the actuating band will move from a completely expanded position in which it is centered by the surrounding support to a position in which the gripping bands are firmly applied regardless of variations in the movement required due to wear on the gripping band means.

While only an external contracting construction is shown and described herein, it is apparent that an internal expanding construction might be used such as is fully set forth in my copending application Serial No. 198,378, filed in the United States Patent Office on March 28, 1938.

Further objects and advantages of the invention will be apparent from the description and claims.

In the drawing, in which an embodiment of my invention is shown,

Figure 1 is a transverse section through a rotation controlling construction substantially on the line 1—1 of Fig. 2;

Fig. 2 is an axial section substantially on the line 2—2 of Fig. 1; and

Fig. 3 is a section substantially on the line 3—3 of Fig. 1.

Referring to the drawing in detail, the construction shown comprises a rotatable shaft 1, which may be part of a transmission for an automobile or the like, a member 2 rotatable with the shaft and having an external cylindrical grip surface 3, a plurality of arcuate gripping band members 4 and 4a (two being shown) surrounding the grip surface 3 and movable into and out of engagement therewith, a metal actuating band 5 surrounding the gripping band members 4 and 4a to which the gripping band members are secured so that contraction and expansion of the actuating band moves the gripping band members into and out of engagement with respect to the grip surface, a cylindrical supporting ring 6 having a cylindrical inner supporting surface against which the actuating band 5 expands and rests when in its completely expanded position, a casing 7 in which this supporting and positioning ring 6 is mounted, anchorage means 8 for securing one end of the actuating band 5 against circumferential movement, and actuating means 9 for effecting circumferential movement of the other end of the actuating band to effect the contracting and expanding movement of the actuating band.

The actuating means for the actuating band shown comprises a rock shaft 10 rockably mounted in a bearing bushing 11 screwed into the casing 7 and having a crank pin 12 operating in a slot or groove 13 in a block 14 secured to the movable end of the actuating band. The supporting and positioning ring 6 is provided with a suitable opening 15 through which the block of the actuating band extends and in which it is movable. The positioning ring is also provided with an opening to snugly receive an anchorage block 16 to which one end of the actuating band 5 is secured and to which one end of the arcuate gripping member 4 also is secured by means of rivets 17. The supporting and positioning ring is also provided with an opening to receive an anchorage block 18 secured to the gripping band member 4a by means of rivets 19 or the like. These rivets extend through slots 20 in the actuating band so that provision is thus made for some relative circumferential movement between the gripping band member 4a and the actuating band. This lost motion connection between the gripping band member 4a and the actuating band is provided because of the fact that in its expanding and contracting movement portions of the actuating band must have some circumferential movement and in the circumferential movement the anchorage for the gripping band member must not be disturbed or interfered with. Each gripping band member may comprise an arcuate member 21 made of suitable gripping material secured to an arcuate metal backing member 22 in any suitable manner, the metal backing members being provided with the anchorage blocks 17 and 18 for holding them against circumferential movement. Each of the metal backing members of the gripping members 22 may be secured to the actuating band 5 at at least one point by means of rivets 23 or the like, the supporting and positioning ring 6 being provided with suitable opening 24 to provide clearance for the heads of these rivets. The actuating band 5 is slotted circumferentially at 23a, where rivets 23 intersect it, to allow free circumferential movement of band 5.

In use it will be seen that the actuating band 5 is limited in its expanding movement by engagement with the inner cylindrical surface of the supporting and positioning ring 6, and that the actuating band 5 is thus centered with respect to the axis of the shaft and drum. This positioning band thus definitely limits the expanding movement of the actuating band and positions and centers it with respect to the axis of the shaft and the rotatable drum.

Assuming that the rotatable drum is rotating in the direction of the arrow A in Fig. 1 and that the rock shaft 12 is rotated to move the crank pin and block member upwardly, this will cause the actuating band 5 to contract and to move radially inwardly, causing the gripping band members 4 and 4a to snugly engage the grip surface of the rotatable drum 2. As each of the gripping members is of considerable extent, there will be a considerable amount of self-energized retarding action due to the extent of wrap of the arcuate gripping members. The anchorage block 17 will serve as an anchor for the gripping band member 4, and the anchorage block 18 will serve as anchorage means for the other gripping band member. It will be seen that because of the accurate centering of the actuating band in its expanded position, a minimum amount of movement of the actuating member is needed, thus requiring only a relatively small movement of the band actuating member and enabling the gripping band members 4 and 4a to be moved into snug engagement with the grip surface even though the gripping band members are considerably worn.

It will be seen that in the construction disclosed the supporting and positioning ring 6 definitely positions the actuating band 5 in its extreme expanded position so that it is concentric with the rotatable member 2 so that the gripping band members 4 and 4a will then be uniformly spaced throughout their extent with respect to the grip surface 3 of the rotatable member; that the gripping band members are held against circumferential movement without interfering with the proper action of the actuating band 5; that the expanding and contracting movement of the actuating band is reduced to a minimum consistent with good practice; and that the actuating band will move from its completely expanded position to a position in which the gripping band members are firmly applied regardless of variations in the movement required due to wear on the gripping band members.

It will be seen that the radial forces resulting both from the grip-applying forces and the anchorage loads are counter-balanced because of the two anchorage blocks 16 and 18 located at diametrically opposite points which handle the gripping load and because of the full wrap which handles the grip-applying forces. As a consequence of this counterbalancing, the radial forces acting on the rotatable member will be reduced substantially to zero.

Further modifications will be apparent to those skilled in the art, and it is desired, therefore, that the invention be limited only by the prior art and the scope of the appended claims.

Having thus described my invention, what I claim and desire to secure by Letters Patent is:

1. A rotation controlling construction comprising a rotatable member having an external cylindrical grip surface, a plurality of arcuate gripping band members surrounding said grip surface spaced circumferentially from each other and engageable successively with the same portion of said grip surface and movable into and out of engagement therewith, an actuating band surrounding said gripping band members to which said gripping band members are secured so that contraction and expansion of the actuating band will move the gripping band members into and out of engagement with respect to said grip surface, means for moving one end of the actuating band circumferentially with respect to the other end to effect contracting and expanding movement of the actuating band, the connection of one of said gripping band members with the actuating band enabling circumferential movement of the actuating band member with respect to the gripping band, and opposed means for fixedly anchoring one end of each of said gripping band members against circumferential movement.

2. A rotation controlling construction comprising a rotatable member having an external cylindrical grip surface, a plurality of arcuate gripping band members surrounding said grip surface and movable into and out of engagement therewith, an actuating band surrounding said gripping band members to which said gripping band members are secured so that contraction and expansion of the actuating band will move the gripping band members into and out of engagement with respect to said grip surface, means for anchoring one end of said actuating band against circumferential movement, means for moving the other end of the actuating band circumferentially to effect contracting and expanding movement of the actuating band, the connection of one end of one of said gripping band members with the actuating band enabling circumferential movement of the gripping band member with respect to the actuating band, means for anchoring said end of said gripping band member against circumferential movement comprising an anchorage member secured to said gripping band member extending through said actuating band, and a fixed abutment engaged by said anchorage member.

3. A rotation controlling construction comprising a rotatable member having an external cylindrical grip surface, a plurality of arcuate gripping band members surrounding said grip surface and movable into and out of engagement therewith, an actuating band surrounding said gripping band members to which said gripping band members are secured to prevent relative radial movement between said actuating band and gripping band so that contraction and expansion of the actuating band will move the gripping band members into and out of engagement with respect to said grip surface, means for anchoring one end of said actuating band against circumferential movement, means for moving the other end of the actuating band circumferentially to effect contracting and expanding movement of the actuating band, the connection of one end of one of said gripping band members with the actuating band enabling circumferential movement of the gripping band member with respect to the actuating band, and means for anchoring said end of said gripping band member against circumferential movement, said construction having provisions whereby the resultant of combined forces acting on said rotatable member counterbalance each other and are reduced substantially to zero.

4. A rotation controlling construction comprising a rotatable member having an external cylindrical grip surface, a plurality of arcuate gripping band members surrounding said grip surface and movable into and out of engagement therewith, an actuating band surrounding said gripping band members to which said gripping band members are secured so that contraction and expansion of the actuating band will move the gripping band members into and out of engagement with respect to said grip surface, means for anchoring one end of said actuating band against circumferential movement, means for moving thhe other end of the actuating band circumferentially to effect contracting and expanding movement of the actuating band, the connection of one end of one of said gripping band members with the actuating band enabling circumferential movement of the gripping band member with respect to the actuating band, means for anchoring said end of said gripping band member against circumferential movement comprising an anchorage member secured to said gripping band member extending through said actuating band, and an abutment engaged by said anchorage member, said construction having provisions whereby the radial forces acting on said rotatable member counterbalance each other and are reduced substantially to zero.

5. A rotation controlling construction comprising a rotatable member having an external cylindrical grip surface, actuating gripping band means surrounding said grip surface and movable into and out of engagement therewith, an actuating band surrounding said gripping band means to which said gripping band means are secured so that contraction and expansion of said actuating band moves the gripping band means into and out of engagement with said cylindrical grip surface, a cylindrical supporting surface surrounding said actuating band for centering said actuating band and gripping band means when the actuating band is in expanded position, and means whereby said actuating band may be contracted and expanded, said construction having provisions whereby the radial forces acting on said rotatable member counterbalance each other and are reduced substantially to zero.

6. A transmission brake comprising a fixed, accurately formed, closely-surrounding ring; an actuating band lying therein, a plurality of metal brake band segments with friction material secured thereto lying inside said actuating band, an external cylindrical brake surface lying inside said friction material, an anchorage means at one end of each brake band, said anchorage means cooperating with the fixed outer ring to prevent circumferential movement of the brake bands but permitting circumferential movement of the actuating band, separate means for attaching brake bands to the actuating band permitting relative circumferential movement but preventing relative radial movement therebetween, and means for expanding said actuating band into the fixed ring and for contracting the actuating band to force the brake bands into engagement with the brake surface.

7. A transmission brake comprising a fixed, accurately formed, closely-surrounding ring, an actuating band lying therein, a plurality of metal brake band segments with friction material secured thereto lying inside said actuating band, an external cylindrical brake surface lying inside said friction material, an anchorage means at one end of each brake band, said anchorage means cooperating with the fixed outer ring to prevent circumferential movement of the brake bands but permitting circumferential movement of the actuating band, separate means for attaching brake bands to the actuating band permitting relative circumferential movement but preventing relative radial movement therebetween, and means for expanding said actuating band into the fixed ring and for contracting the actuating band to force the brake bands into engagement with the brake surface, said actuating means and anchorage means being oppositely located so that the actions and reactions neutralize, thereby imposing no appreciable load on the center shaft.

8. A transmission brake comprising a fixed, accurately formed, closely-surrounding ring, an actuating band lying therein, a plurality of metal brake band segments with friction material secured thereto lying inside said actuating band, an external cylindrical brake surface lying inside said friction material, an anchorage means at one end of each brake band, said anchorage means cooperating with the fixed outer ring to prevent circumferential movement of the actuating band, separate means for attaching brake bands to the actuating band permitting relative circumferential movement but preventing relative radial movement therebetween, and means for expanding said actuating band into the fixed ring and for contracting the actuating band to force the brake bands into engagement with the brake surface, said brake bands being anchored at their trailing ends to permit a partial wrapping action on each brake band segment.

9. A transmission brake comprising a fixed, accurately formed, closely-surrounding ring, an actuating band lying therein, a plurality of metal brake band segments with friction material secured thereto lying inside said actuating band, an external cylindrical brake surface lying inside said friction material, an anchorage means at one end of each brake band, said anchorage means cooperating with the fixed outer ring to prevent circumferential movement of the brake bands but permitting circumferential movement of the actuating band, separate means for attaching brake bands to the actuating band permitting relative circumferential movement but preventing relative radial movement therebetween, and means for expanding said actuating band into the fixed ring and for contracting the actuating band to force the brake bands into engagement with the brake surface, said brake band segments being so constructed that they may be assembled end for end into their respective places, thus making the clutch brake suitable for right-hand, left-hand or both right-hand and left-hand rotations by merely altering the assembly.

10. A transmission brake comprising a brake drum having an external cylindrical grip surface, a multiplicity of brake bands surrounding said grip surface, spaced circumferentially from each other and engageable successively with the same portion of said grip surface, an actuating band surrounding the brake bands, means connecting said brake bands to said actuating band so that contraction and expansion of said actuating band will move said brake bands into and out of engagement with respect to said grip surface and will enable relative circumferential movement of said brake bands with respect to said actuating band, anchorage and application means for the actuating band located so that the force of actuation and the reaction force on its anchor will substantially cancel each other to produce no shaft load, and anchors for the brake bands located to carry equal loads and circumferentially spaced around the brake drum so that the vector sum of the tangential loads due to torque counteract each other to cause substantially no shaft load.

11. A transmission brake comprising an outer, closely-fitting, fixed ring, a revolvable drum to be braked, a multiplicity of brake bands, means for expanding the brake bands tightly into the fixed ring to insure definite clearance between the band and drum and for contracting the band toward the revolvable drum to brake the drum comprising an actuating band surrounding the brake band, and anchorage and application means for the actuating band located so that the force of actuation and the reaction force on its anchor will substantially cancel each other to produce no shaft load, the anchors of the brake bands being located to carry equal loads and arranged around the circle so that the vector sum of the tangential loads due to torque counteract each other to cause substantially no shaft load.

12. A brake construction comprising a rotatable member having a cylindrical grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, and means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface.

13. A brake construction comprising a rotatable member having a cylindrical grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, and means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface, the securing means between the brake straps and the actuating band including lost motion means whereby a portion of the strap may have a circumferential movement with respect to the actuating band.

14. A brake construction comprising a rotatable member having a cylindrical grip surface, a plurality of arcuate flexible brake straps engageable and disengageable with respect to said cylindrical grip surface, a flexible actuating band bearing on said flexible brake straps, means for securing each of said flexible brake straps to said flexible actuating band at a plurality of circumferentially spaced points to prevent relative movement therebetween, and means for effecting relative circumferential movement between the ends of said actuating band to force the flexible brake straps snugly against the cylindrical grip surface, the securing means between the brake straps and the actuating band including lost motion means whereby a portion of the strap may have a circumferential movement with respect to the actuating band.

15. A brake construction comprising a rotatable member having a cylindrical grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface, the securing means between the brake straps and the actuating band including lost motion means whereby a portion of the strap may have a circumferential movement with respect to the actuating band, and means for holding said flexible brake band straps against circumferential movement with the rotatable member while enabling said lost motion circumferential movement.

16. A brake construction comprising a rotatable member having a cylindrical grip surface, a plurality of arcuate flexible brake straps engageable and disengageable with respect to said cylindrical grip surface, a flexible actuating band bearing on said flexible brake straps, means for securing each of said flexible brake straps to said flexible actuating band at a plurality of circumferentially spaced points to prevent relative movement therebetween, means for effecting relative circumferential movement between the ends of said actuating band to force the flexible brake straps snugly against the cylindrical grip surface, the securing means between the brake straps and the actuating band including lost motion means whereby a portion of the strap may have a circumferential movement with respect to the actuating band, and means for holding said flexible brake band straps against circumferential movement with the rotatable member while enabling said lost motion circumferential movement.

17. A brake construction comprising a rotatable member having a cylindrical grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface, and means for holding said flexible brake band straps against circumferential movement with said rotatable member.

18. A brake construction comprising a rotatable member having a cylindrical external grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, and means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface.

19. A brake construction comprising a rotatable member having a cylindrical external grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface, the securing means between the brake straps and the actuating band including lost motion means whereby a portion of the strap may have a circumferential movement with respect to the actuating band, and means for holding said flexible brake band straps against circumferential movement with the rotatable member while enabling said lost motion circumferential movement.

20. A brake construction comprising a rotatable member having a cylindrical grip surface, a support having a continuous arcuate supporting and positioning surface adjacent said grip surface and coaxial therewith, a plurality of arcuate flexible brake straps engageable and disengageable with respect to said cylindrical grip surface, a flexible actuating band between said flexible brake straps and said continuous arcuate supporting surface, means for securing each of said flexible brake straps to said flexible actuating band at a plurality of circumferentially spaced points to prevent relative radial movement between said straps and actuating band, means for effecting relative circumferential movement between the ends of said actuating band in one direction to force the flexible brake straps snugly against the cylindrical grip surface and in the opposite direction to force the flexible actuating band snugly against the continuous arcuate supporting and positioning surface to insure a definite clearance between the flexible brake straps and the cylindrical grip surface, the securing means between the brake straps and the actuating band including lost motion means whereby a portion of the strap may have a circumferential movement with respect to the actuating band, and means for holding said flexible brake band straps against circumferential movement with the rotatable member while enabling said lost motion circumferential movement, comprising a holding member extending through said flexible actuating band.

ADIEL Y. DODGE.